United States Patent
Nagahori

(10) Patent No.: US 6,525,858 B1
(45) Date of Patent: Feb. 25, 2003

(54) OPTICAL RECEIVER AND OPTICAL NETWORK SYSTEM USING THEREOF

(75) Inventor: Takeshi Nagahori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/090,145

(22) Filed: Jun. 4, 1998

(30) Foreign Application Priority Data

Jun. 4, 1997 (JP) .............................................. 9-145671

(51) Int. Cl.[7] .............................................. H04B 10/06
(52) U.S. Cl. .................. 359/189; 359/120; 359/121; 359/125; 359/133; 359/135; 359/137; 359/123; 250/214 A; 250/214 R; 330/308; 330/59
(58) Field of Search ................................. 359/189, 195, 359/120, 121, 125, 133, 137, 135; 250/214 A, 214 R; 330/308, 59

(56) References Cited

U.S. PATENT DOCUMENTS

| | | | | |
|---|---|---|---|---|
| 4,039,824 A | * | 8/1977 | Nanba ........................ 250/201 |
| 4,188,551 A | * | 2/1980 | Iwasaki et al. ............. 307/311 |
| 5,025,456 A | | 6/1991 | Ota et al. |
| 5,295,013 A | * | 3/1994 | Ono ............................ 359/192 |
| 5,355,242 A | * | 10/1994 | Eastmond et al. .......... 359/189 |
| 5,475,671 A | * | 12/1995 | Ishikawa .................... 369/120 |
| 5,477,370 A | * | 12/1995 | Little et al. ................. 359/189 |
| 5,579,144 A | * | 11/1996 | Whitney ..................... 359/153 |
| 5,594,577 A | * | 1/1997 | Majima et al. ............. 359/124 |
| 5,612,810 A | * | 3/1997 | Inami et al. ................ 359/189 |
| 5,652,425 A | * | 7/1997 | Sawada et al. ........... 250/214 A |
| 5,693,934 A | * | 12/1997 | Hohmoto et al. ........ 250/214 A |
| 5,708,471 A | * | 1/1998 | Okumura .................... 348/301 |
| 5,773,815 A | * | 6/1998 | Stevens ................... 250/214 A |
| 5,790,295 A | * | 8/1998 | Devon ........................ 359/189 |
| 5,872,644 A | * | 2/1999 | Yamazaki et al. .......... 359/121 |
| 5,896,213 A | * | 4/1999 | Nagahori et al. ........... 359/137 |
| 6,064,507 A | * | 5/2000 | Heflinger et al. ........... 359/237 |

FOREIGN PATENT DOCUMENTS

| | | |
|---|---|---|
| JP | 61-30139 | 2/1986 |
| JP | 61-30139 A | 2/1986 |
| JP | 2-156575 | 6/1990 |
| JP | 2-232531 | 9/1990 |
| JP | 2-266630 | 10/1990 |
| JP | 9-130169 | 5/1997 |

OTHER PUBLICATIONS

"Wide Dynamic Range Preamplifier LSI Mode Optical Receiver" (p. 223), lecture No. C–501, in Electronics society, IEICE (Institute of Electrics, Information and Communication Engineerings), 1995.

"A low loss multiplexing scheme for PDS System" (p. 621), lecture No. B–10–112, in general meeting of IEICE, 1997.

* cited by examiner

Primary Examiner—Leslie Pascal
Assistant Examiner—Hanh Phan
(74) Attorney, Agent, or Firm—Scully, Scott, Murphy & Presser

(57) ABSTRACT

A subscriber-line terminal apparatus comprising an access control circuit for time-division multiple access to a plurality of subscriber-line terminating sets, a multi-channel array optical transmitter, and a multi-channel optical receiver, the receiver comprising a differential input amplifier, a first photoelectric converter element whose cathode is connected to a reverse-bias power supply and whose anode is connected to one input terminal of the differential input amplifier, and a second photoelectric converter element whose anode is connected to a reverse-bias power supply and whose cathode is connected to the other input terminal of the differential input amplifier.

8 Claims, 6 Drawing Sheets

OPTICAL RECEIVER AND OPTICAL NETWORK SYSTEM USING THEREOF

BACKGROUND OF THE INVENTION

1. Field of the Invention

The present invention relates to an optical receiver and an optical network system using thereof, particularly to an optical receiver preferably used for a star-type optical network such as an optical subscriber system and a station-side apparatus of the star-type optical network.

2. Description of the Related Art

A PON (Passive Optical Network) system is known as means for economically realizing an optical subscriber system, which is disclosed in the official gazette of Japanese Patent Laid-Open No. 61-30139. The PON system aims at economization by connecting optical transceivers 121 and 131 in one station side 100 with optical transceivers 221 to 22N and 231 to 23N in a plurality of subscriber-sides 201 to 20N by single-mode fibers 301 to 30N through a passive splitter 141 and thereby, sharing one station-side optical transceiver by a plurality of subscribers as shown in FIG. 5.

However, a lot of branch loss due to a passive splitter 141 and deterioration of the reception sensitivity of an up receiving section related to optical burst transmission for time-division multiple access cause the number of branches to be extremely restricted or the price of a subscriber-side optical transceiver for obtaining a required number of branches to rise.

In FIG. 5, symbols 110 and 211 to 21N denote access control sections and 241 to 24N denote optical couplers.

As means for effecting a system at less allowable loss between transmission and reception sides while making the best use of the access control system of the PON, the following are known instead of a passive splitter: passive multiplexing using a single-mode multi-mode combiner, passive multiplexing of leading the light emitted from a plurality of single fibers to a large-aperture photoelectric converter element by using a lens, and passive multiplexing of connecting a plurality of single-mode fibers with an array photoelectric converter element constituted with a plurality of photoelectric converter element and receiving the output light current of the array photoelectric converter element by one electronic circuit. These arts are described in "PDS constitution method reducing confluent loss of up signal" (p. 621) in the lecture number B-10-112 in the general meeting of IEICE (Institute of Electronics, Information, and Communication Engineers) in 1997.

Particularly, the passive multiplexing using the array photoelectric converter element shown in FIG. 6 is prospective because expensive optical parts such as a single-mode multi-mode combiner and a large-aperture lens coupling system are unnecessary.

The structure of a passive-multiplexing optical receiver using a conventional array photoelectric converter element is described below by referring to FIG. 6.

The optical receiver is a burst receiver in which amplitudes of a receiving-circuit input signal current are suddenly changed every reception packet, which uses a differential amplifier 20 at the initial stage of the receiving circuit similarly to the case of the burst receiving circuit disclosed in the official gazette of Japanese Patent Laid-Open No. 2-266630 or described in the lecture number C-501 of the society general meeting of IEICE.

Signal rays emitted from optical fibers 11 to 18 of an eight-core-ribbon optical fiber cable 10 are led to photoelectric converter planes of an 8-channel photodiode array 0 and photoelectrically converted. The photodiode array 0 is formed on a semi-insulating substrate and anode and cathode terminals are output from photoelectric converter elements 1 to 8 forming an array. Anodes of the photoelectric converter elements 1 to 8 are connected in common and connected to a positive-phase input terminal 21 of the differential amplifier 20 and cathodes of the elements 1 to 8 are connected in common and connected to a reverse-bias applying positive power supply VCC.

Moreover, a dummy capacitor 9 having a capacitance almost equal to a parasitic capacitance added to the positive-phase input terminal 21 due to mounting a photodiode on that terminal 21 are connected to the negative-phase input terminal 22 of the differential amplifier 20.

When an optical signal is output from any one of the optical fibers 11 to 18, a photo current enters the positive-phase input terminal 21 of the differential amplifier 20, the potential of a positive-phase output terminal 23 rises, and the potential of a negative-phase output terminal 24 lowers. Thus, passive multiplexing is realized by using an array photoelectric converter element.

The output of the differential amplifier 20 is discriminated between two values of logics "1" and "0" by a discrimination circuit 40 by passing through a discrimination-level control circuit 30 corresponding to a burst signal and is output.

However, the optical receiver using the conventional array photoelectric converter element shown in FIG. 6 has disadvantages that the junction capacitance of the element increases because a lot of photoelectric converter elements are connected in parallel and causes a response speed to deteriorate and noises to increase.

SUMMARY OF THE INVENTION

It is an object of the present invention to constitute an optical receiver having a small junction capacitance between photoelectric converter elements, that is, a high-speed low-noise optical receiver used for passive multiplexing of a time-division multiple-access optical transmission system.

It is another object of the present invention to inexpensively realize extension of a time-division multiple-access optical transmission system or increase of the number of systems to be accommodated, which is very useful.

An optical receiver of the present invention includes a differential input amplifier, a first photoelectric converter element whose cathode is connected to a reverse-bias power supply and whose anode is connected to one input terminal of the differential input amplifier, and a second photoelectric converter element whose anode is connected to a reverse-bias power supply and whose cathode is connected to the other input terminal of the differential input amplifier.

Moreover, the first photoelectric converter element comprises a plurality of photoelectric converter element groups whose cathodes are connected in common and whose anodes are connected in common and the second photoelectric converter element comprises a plurality of photoelectric converter element groups whose cathodes are connected in common and whose anodes are connected in common.

Moreover, at least one of a photoelectric converter element group comprising a plurality of the first photoelectric converter elements, a photoelectric converter element group comprising a plurality of the second photoelectric converter elements, and a photoelectric converter element group comprising the first and second photoelectric converter elements is integrated in a semiconductor substrate.

Furthermore, the differential input amplifier is a transimpedance amplifier returned from a negative-phase output to a positive-phase input and from a positive-phase output to a negative-phase input respectively through a circuit element including a resistance element.

Furthermore, the differential input amplifier includes a first transimpedance amplifier having an input terminal serving as the above one input terminal and a second transimpedance amplifier having an input terminal serving as the above other input terminal and having the same structure as the first transimpedance amplifier, and a differential amplifier using the outputs of the first and second transimpedance amplifiers as differential inputs.

An optical network system of the present invention includes a master station having the above optical receiver, a slave station having an optical transmitter, and an optical fiber for connecting the optical receiver of the master station with the optical transmitter of the slave station.

Moreover, the optical receiver of the master station and the optical transmitter of the slave station are controlled by a time-division multiple-access control circuit.

Functions of the present invention are described below. Photoelectric converter elements constituting a photodiode array are divided into two groups. A reverse bias is applied to cathodes of one group and anodes of the group are connected to one input of a differential input amplifier. A reverse bias is applied to anodes of the other group and cathodes of the group are connected to the other input of the differential input amplifier.

Thus, the number of photoelectric converter elements connected to the input end of the differential input amplifier is halved and thereby, the junction capacitances of the photoelectric converter elements are halved. Therefore, the operation speed of the optical receiver is increased and noises of the optical receiver are reduced. Because noises of the optical receiver are reduced, and a time-division multiple-access optical transmission system is extended or the number of systems to be accommodated is increased by using the optical receiver.

DESCRIPTION OF THE PREFERRED EMBODIMENT

The preferred embodiment of the present invention is described below by referring to the accompanying drawings.

Figure 1:
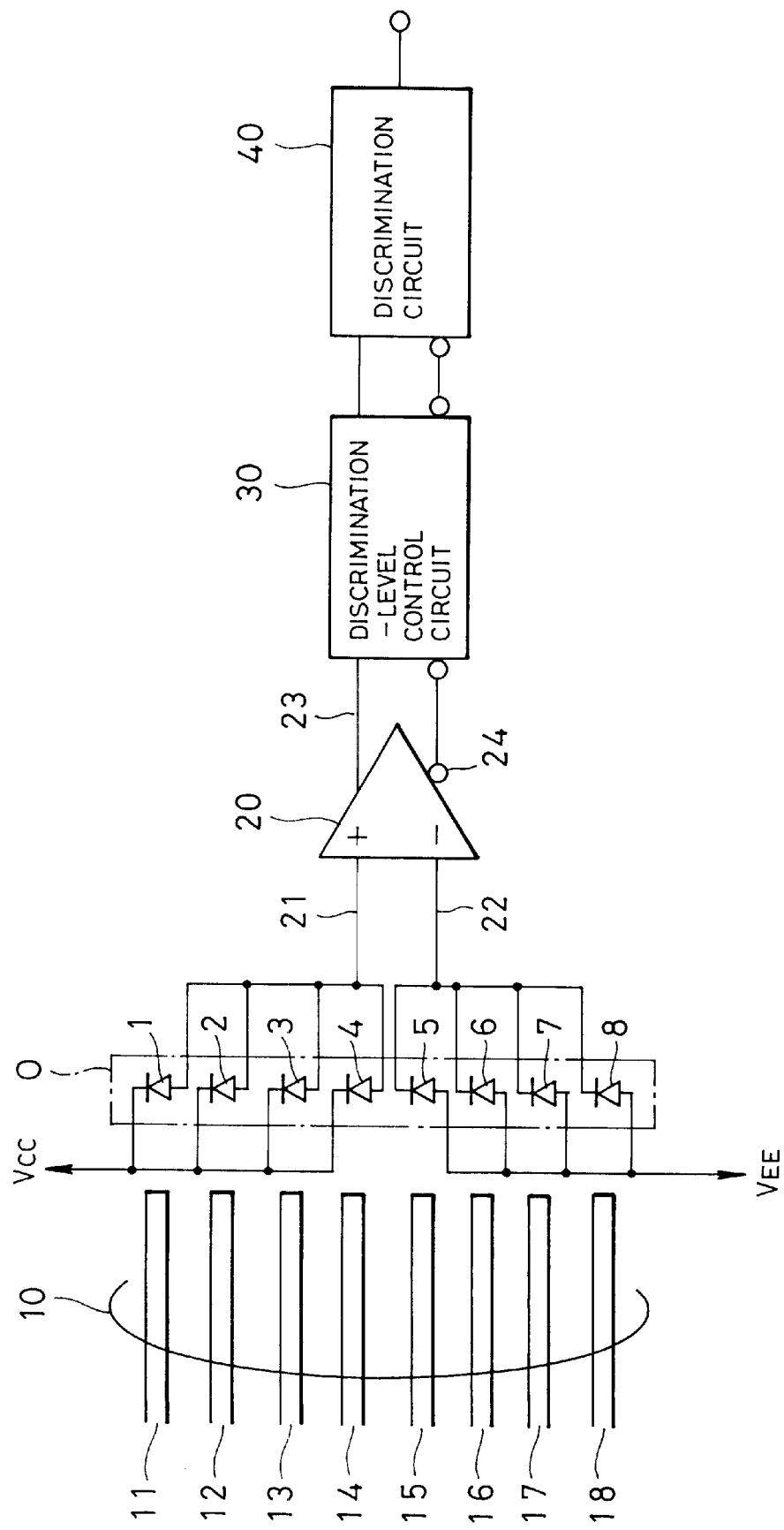
FIG. 1 is a block diagram showing the structure of an embodiment of an optical receiver of the present invention.
Figure 6:
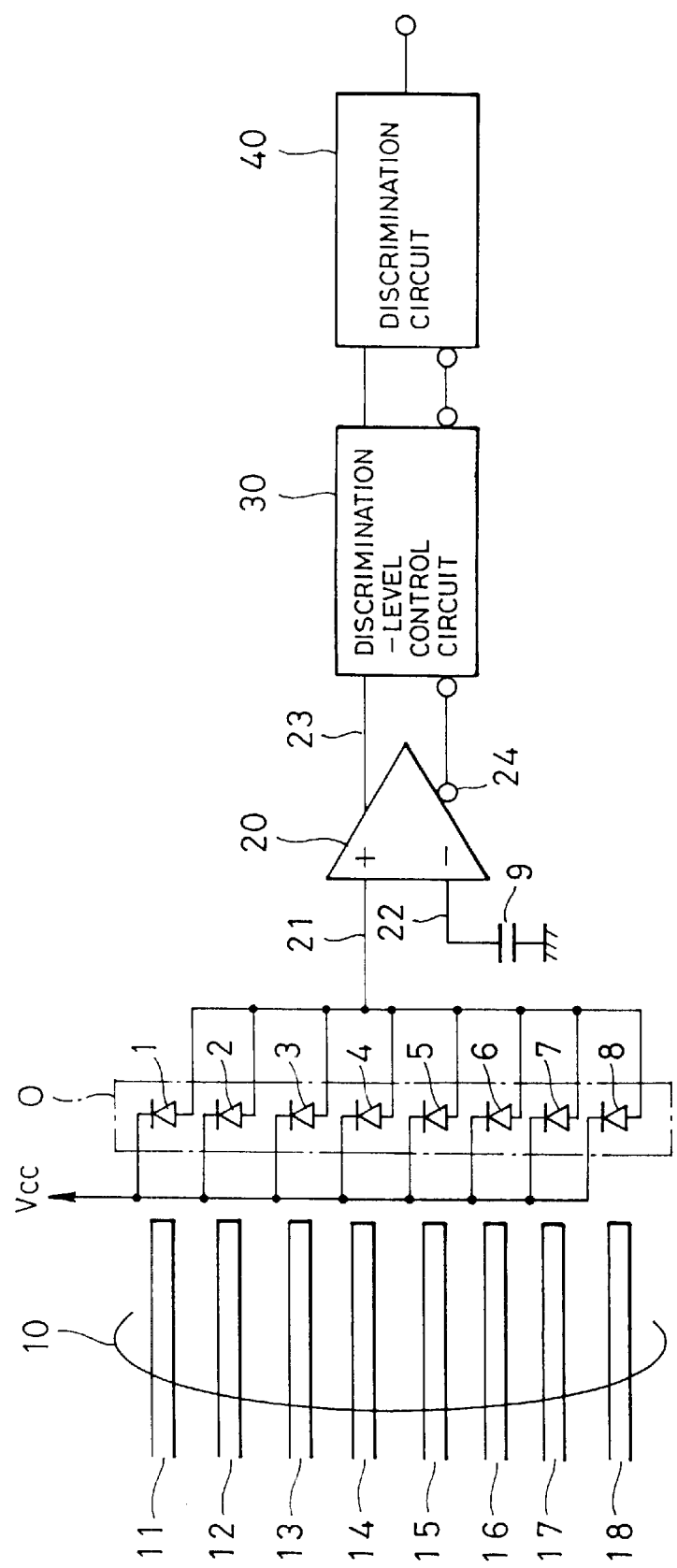
FIG. 6 is a block diagram showing the structure of a conventional optical receiver.

FIG. 1 is a block diagram showing the structure of an embodiment of an optical receiver of the present invention. In FIG. 1, a portion same as that in FIG. 6 is provided with the same symbol. In FIG. 1, signal rays emitted from the optical fibers 11 to 18 of the 8-core-ribbon optical fiber cable 10 are led to the photoelectric converter planes of the 8-channel photodiode array 0 and photoelectrically converted. The photodiode array 0 is formed on a semi-insulating substrate and anode and cathode terminals are output from the photoelectric converter elements 1 to 8 constituting the array.

The anodes of the first to fourth photoelectric converter elements 1 to 4 are connected in common and connected to the positive-phase input terminal 21 of the differential amplifier 20 and the cathodes of the photoelectric converter elements 1 to 4 are connected in common and connected to a reverse-bias-applying positive power supply VCC. The anodes of the fifth to eighth photoelectric converter elements 5 to 8 are connected in common and connected to a reverse-bias-applying power supply VEE and the cathodes of the photoelectric converter elements 5 to 8 are connected in common and connected to a negative-phase output terminal 22 of the differential amplifier 20.

When an optical signal is output from any one of the optical fibers 11 to 14, a photo current enters the positive-phase input terminal 21 of the differential amplifier 20, the potential of the positive-phase output terminal 23 rises, and the potential of the negative-phase output terminal 24 lowers. However, when an optical signal is output from any one of the optical fibers 15 to 18, a photo current goes out of the negative-phase input terminal 22 of the differential amplifier 20, the potential of the positive-phase output terminal 23 rises, and the potential of the negative-phase output terminal 24 lowers. Thus, passive multiplexing is realized by applying an array photoelectric converter element similarly to the case of the conventional optical receiver shown in FIG. 6.

The output of the differential amplifier 20 is discriminated between two values of "1" and "0" by the discrimination circuit 40 by passing through the discrimination-level control circuit 30 corresponding to a burst signal and is output.

Then, capacitances of parasitic elements applied to input terminals of the differential amplifiers 20 are compared each other between this embodiment and the conventional example shown in FIG. 6. Both are 8-multiplexing optical receivers using an 8-core-ribbon fiber and an 8-channel photodiode. Four photoelectric converter elements are connected to the input terminals 21 and 22 respectively in the case of this embodiment while 8 elements and dummy capacitances equivalent to 8 elements are connected to the input terminal 21 and 22 respectively in the case of the conventional example.

Therefore, the parasitic capacitance applied to the input terminal of the differential amplifier 20 of this embodiment is halved compared to the case of the conventional example. Therefore, noises of the receiver of this embodiment are reduced and the operation speed of it is increased compared to the case of the conventional example. In other words, by optimizing and designing the differential amplifier 20 so that the operation speed becomes equal to that of a conventional optical receiver, noises are greatly reduced compared to the case of the conventional optical receiver.

This embodiment uses an 8-channel photodiode array as an optical photoelectric converter element in order to constitute an 8-channel optical receiver. However, it is unnecessary that the number of channels of the optical receiver coincides with the number of elements for one chip of a photodiode array. For example, it is also possible to use two 4-channel photodiode arrays or eight single-core photodiodes.

Figure 2:
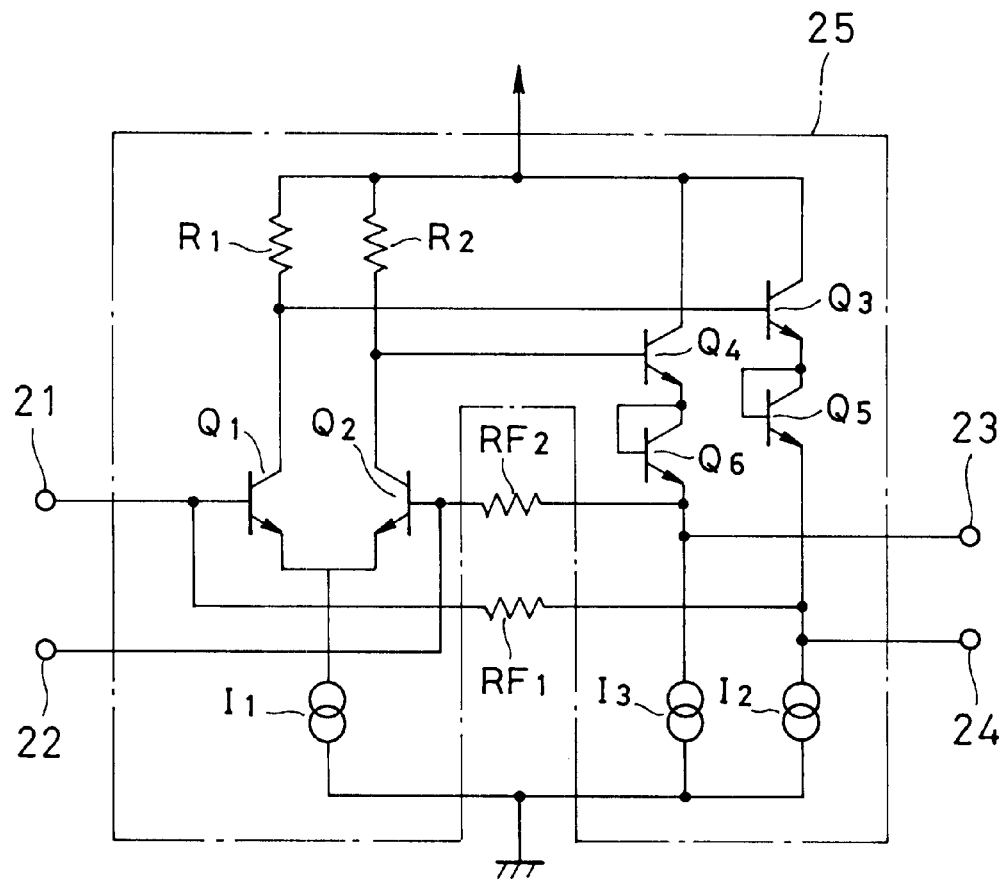
FIG. 2 is the first structure of a differential input amplifier applied to an optical receiver of the present invention.

FIG. 2 is a circuit diagram showing an example of the differential amplifier 20 used for an optical receiver of the present invention. This is a transimpedance amplifier returned from the negative-phase output 24 to the positive-phase input 21 of a differential amplifier 25 and from the positive-phase output 23 to the negative-phase input 22 of the amplifier 25 through resistances RF1 and RF2 respectively.

In the case of the differential amplifier 25, bases of differential paired transistors Q1 and Q2 serve as the input terminals 21 and 22 and a complementary output is alternately deviced from collector resistances R1 and R2 of the transistors Q1 and Q2. Symbol I1 denotes the current source of the differential transistors Q1 and Q2.

This pair of complementary outputs serve as base inputs of emitter follower transistors Q3 and Q4 and the emitter outputs serve as a pair of differential outputs 23 and 24 through a level shift diode comprising transistors Q5 and Q6 having a diode connection structure. Symbols I2 and I3 denote the current source of an emitter follower circuit comprising the emitter follower transistors Q3 and Q4.

Moreover, because the output 23 is returned to the input 22 through the resistance RF2 and the output 24 is returned to the input 21 through the resistance RF1, a transimpedance amplifier is constituted as a whole. The transimpedance amplifier is used as the differential amplifier 20 because a photodiode functions as a current source and therefore, the input impedance of an amplifier for amplifying the output of the photodiode must be minimized and the amplification degree of the amplifier must be maximized. Thus, this is realized by the feedback resistances RF1 and RF2.

Figure 3:
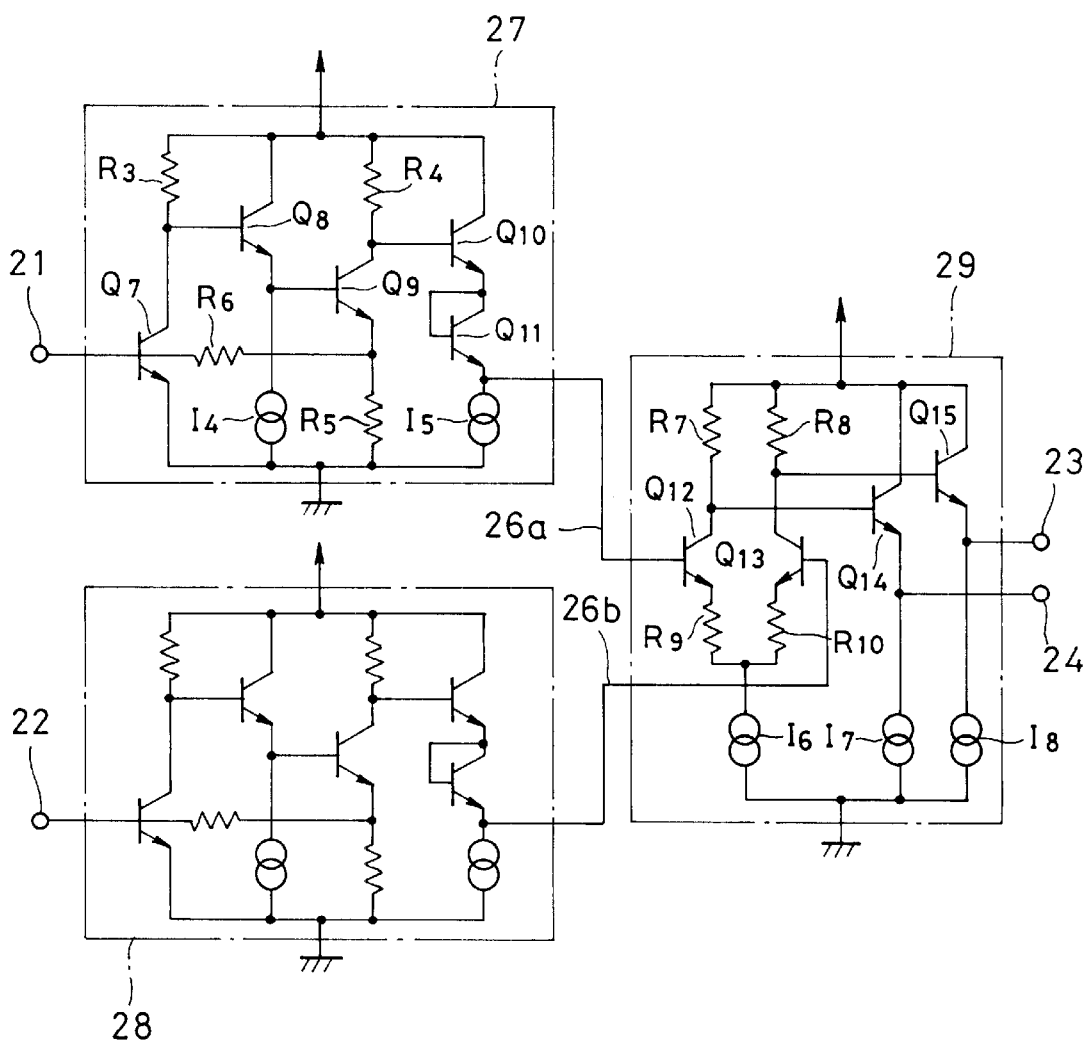
FIG. 3 is the second structure of a differential input amplifier applied to an optical receiver of the present invention.

FIG. 3 is a circuit diagram showing another example of the differential amplifier 20 used for an optical receiver of the present invention. The circuit comprises non-inverting transimpedance amplifiers 27 and 28 and a differential amplifier 29. By connecting the output of the transimpedance amplifier 27 to the positive-phase input 26a of the differential amplifier 29 and the output of the transimpedance amplifier 28 to the negative-phase input 26b of the differential amplifier 29, the input of the transimpedance amplifier 27 serves as the positive-phase input terminal 21 of the differential amplifier 20 in FIG. 1 and the input of the transimpedance amplifier 28 serves as the negative-phase input terminal 22 of the differential amplifier 20.

More minutely, the transimpedance amplifier 27 comprises transistors Q7 to Q11, a current source I5, and resistances R3 to R6, in which the resistance R6 serves as a feedback resistance. The transimpedance amplifier 28 has the same structure as the transimpedance amplifier 27 and therefore, its description is omitted.

The differential amplifier 29 at the output stage has differential paired transistors Q12 and Q13, collector resistances R7 and R8, emitter follower transistors Q14 and Q15 using a pair of complementary outputs as base inputs by the collector resistances R7 and R8, and current sources I6 to I8. Emitter outputs of the emitter follower transistors Q14 and Q15 serve as the outputs 23 and 24 of the differential amplifier.

Figure 4:
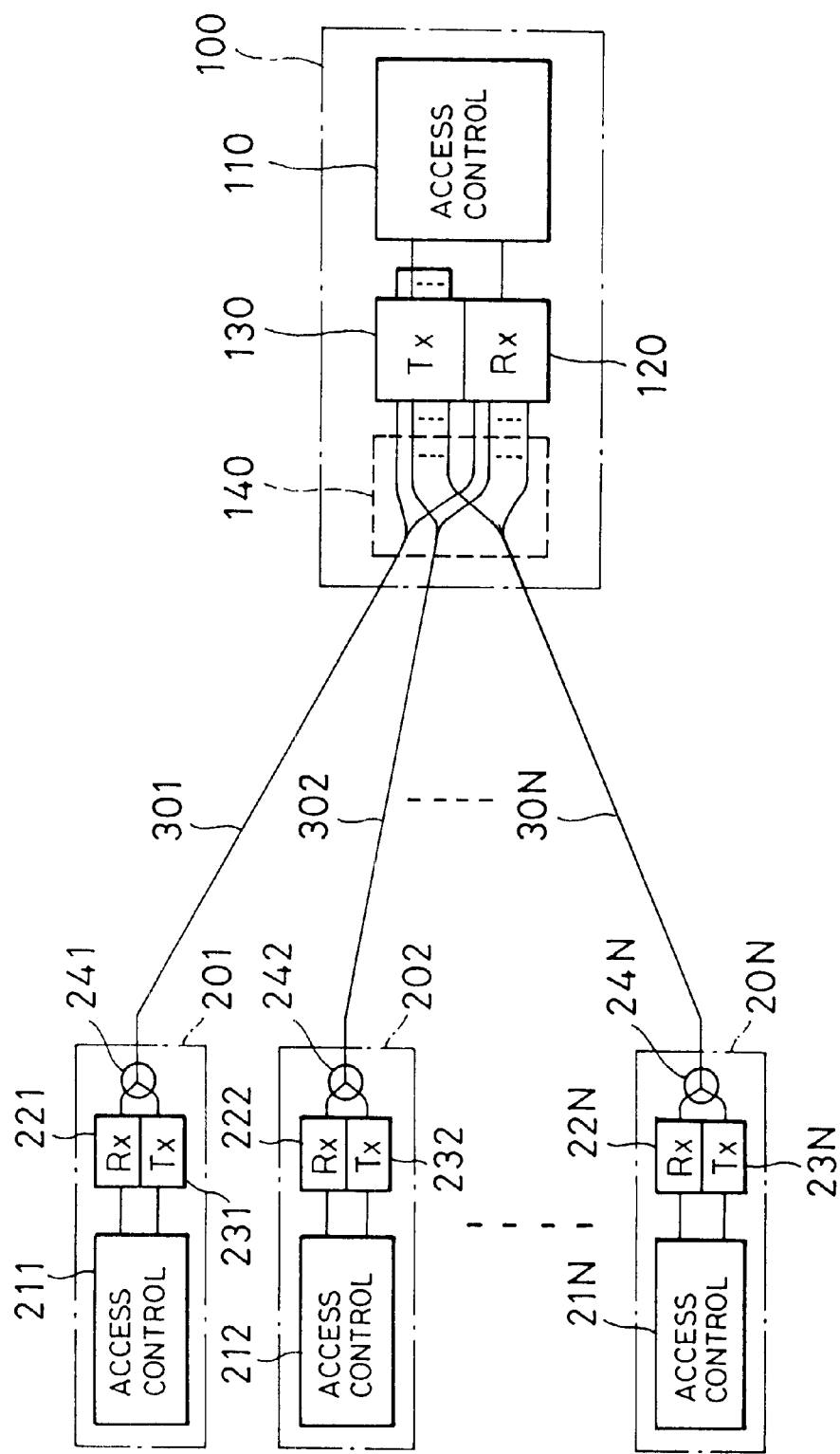
FIG. 4 is a block diagram showing the structure of an embodiment of an optical network of the present invention.

FIG. 4 is a block diagram showing an embodiment of an optical network system using an optical receiver of the present invention. A subscriber-line terminal apparatus 100 set in a station house is connected with subscriber terminating sets 201, 202, . . . , and 20N through optical fibers 301, 302, . . . , and 30N. An access control circuit 110 for time-division multiple access to the subscriber-line terminating sets 201, 202, . . . , and 20N and an N-channel array optical receiver 120, N-channel array optical transmitter 130, and optical junctor 140 described in the embodiment are mounted on the subscriber-line terminal apparatus 100.

Access control circuits 211, 212, . . . , and 21N for time-division multiple access to the subscriber-line terminal apparatus 100, optical receivers 221, 222, . . . , and 22N, optical transmitters 231, 232, . . . , and 23N, and optical couplers 241, 242, . . . , and 24N are mounted on the subscriber-line terminating sets 201, 202, . . . , and 20N.

In the case of a down transmission system from the subscriber-line terminal apparatus 100 to subscriber-line terminating sets 201, 202, . . . , and 20N, a signal ray of a 1.55-$\mu$m band output from the k-th channel ($1 \leq k \leq N$) of the k-the array optical transmitter 130 is multiplexed with and branched from an up signal ray of a 1.3-$\mu$m band input to the k-th channel of the array optical receiver 120 by the optical junctor 140, led to an optical fiber 30k, and transmitted to the k-th subscriber-line terminating set 20k by the fiber 30k.

The subscriber-line terminating set 20k multiplexes and branches signal of a 1.3-$\mu$m band by an optical coupler 24k and then, receives the signal by an optical receiver 22k in which the signal is converted into an electric digital signal and terminated in an access control circuit 21k.

In the up transmission system from the k-th subscriber-line terminating set 20k to the subscriber-line terminal apparatus 100, the signal ray of a 1.3-$\mu$m band emitted from an optical transmitter 23k in accordance with the control by the access control circuit 21k is multiplexed with and branched from the down signal of a 1.55-$\mu$m band by the optical coupler 24k, led to the optical fiber 30k, and transmitted up to the subscriber-line terminal apparatus 100 by the fiber 30k. Then, the signal is multiplexed with and branched from a down 1.3-$\mu$m-band signal output from the k-th channel of the array optical transmitter 130 by and the optical junctor 140 led to the k-th channel of an array optical receiver.

At the electric input terminal of the array optical transmitter 130, connection is made so that all channels are changed to a logic "1" or "0" at the same time. Thereby, in the case of the down transmission system, multiple address distribution same as the case of the PON system using the optical passive splitter 141 shown in FIG. 5 is performed.

Figure 5:
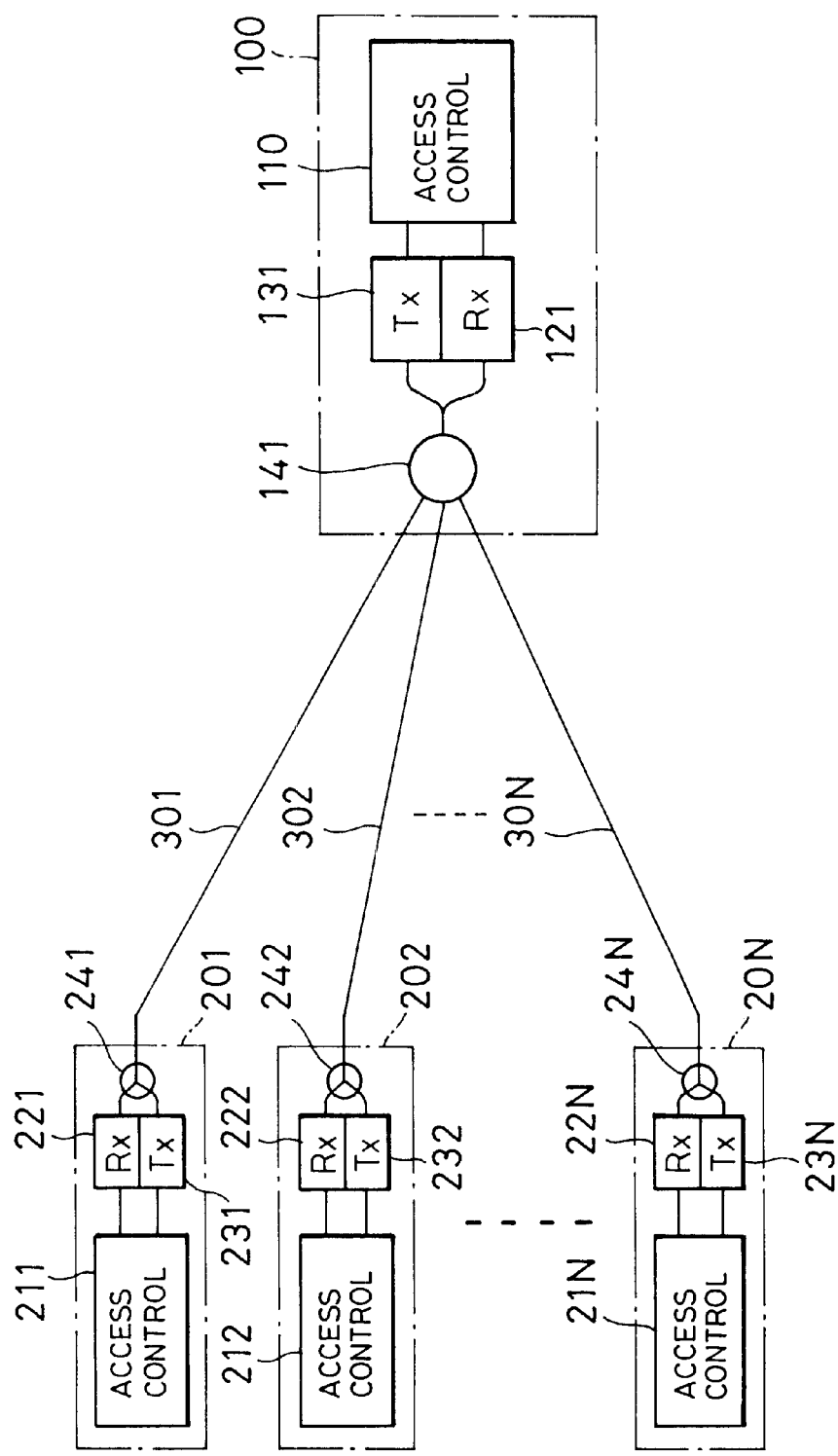
FIG. 5 is a block diagram showing the structure of a PON system.

Moreover, in the case of the up transmission system, because passive multiplexing is performed in an optical receiver as described in the embodiment of an optical receiver, the passive multiplexing same as the case of the PON system using the optical passive splitter 141 shown in FIG. 5 is performed. Thus, it is possible to construct an optical subscriber transmission system by directly using the access control circuits 110 and 211, 212, . . . , and 21N of the existing PON system shown in FIG. 5.

Because the optical junctor 140 only multiplexes and branches an up signal with and from a down signal, the branch loss between a transmitter and a receiver of the present, invention results in 1/N the branch loss between transmission and reception of the PON system shown in FIG. 5, that is, a value smaller by 10 log N dB. In the case of a passive-multiplexing array optical receiver, however, the improved value of the allowable loss between transmission and reception becomes less than 10 log N dB because the reception sensitivity and response speed are deteriorated due to increase of a parasitic capacitance added to the input section of an input circuit.

In the case of an array optical receiver of the present invention, a parasitic capacitance added to the input section of a receiving circuit is halved compared to the case of a conventional array optical receiver and thereby, deterioration of the reception sensitivity and response speed is minimized. Therefore, the allowable loss between transmission and reception is remarkably improved by performing passive multiplexing by a photoelectric converter element allay instead of an optical passive splitter.

The optical network of this embodiment uses one N-channel array optical receiver in order to accommodate N subscriber-line terminating sets. However, it is also possible to use a plurality of optical receivers having the number of channels less than N.

In the case of this embodiment, the k-th channel of the array optical transmitter 130 and the k-th channel of the array optical receiver 120 are connected one to one in the case of the k-th subscriber-line terminating set. However, it is also possible to set an optical passive splitter of M branches between the subscriber-line terminal apparatus 100 and the subscriber-line terminating set 20k and connect M subscriber-line terminating sets every channel of an array optical transmitter and every channel of an optical receiver. In this case, the number of subscriber-line terminating sets to be accommodated for each N-channel array optical transmitter and array optical receiver comes to M×N.

Though the optical network of this embodiment uses wavelength multiplexing to multiplex up and down signals, it is also possible to use other multiplexing method. For example, it is possible to use the time-division compression multiplexing (ping-pong transmission) or the space-division multiplexing using an independent optical fiber for up transmission and down transmission respectively.

As described above, the present invention makes it possible to constitute an optical receiver comprising a photoelectric converter element having a small junction capacitance, that is, a high-speed low-noise optical receiver used for passive multiplexing of a time-division multiple-access optical transmission system. Moreover, by using the receiver, it is possible to inexpensively realize extension of a time-division multiple-access optical transmission system or increase of the number of systems to be accommodated, which is very useful.

What is claimed is:

1. An optical receiver comprising a differential input amplifier, a first photoelectric converter element whose cathode is connected to a reverse-bias power supply and whose anode is connected to one input terminal of said differential input amplifier, and a second photoelectric converter element whose anode is connected to a reverse-bias power supply and whose cathode is connected to the other input terminal of said differential input amplifier;

wherein said first photoelectric converter element includes a plurality of photoelectric converter element groups whose cathodes are connected in common and whose anodes are connected in common and said second photoelectric converter element includes a plurality of photoelectric converter element groups whose cathodes are connected in common and whose anodes are connected in common; and wherein at least one of a first photoelectric converter element group including a plurality of said first photoelectric converter element group including a plurality of said first photoelectric converter elements, a second photoelectric converter element group including a plurality of said second photoelectric converter elements, and a photoelectric converter element group including said first and second photoelectric converter elements is integrated in a semiconductor substrate.

2. The optical receiver according to claim 1, wherein said differential input amplifier is a transimpedance amplifier returned from a negative-phase output to a positive-phase input and from a positive-phase output to a negative-phase input respectively through a circuit element including a resistance element.

3. The optical receiver according to claim 1, wherein said differential input amplifier includes a first transimpedance amplifier having an input terminal serving as said one input terminal serving as said one input terminal, a second transimpedance amplifier having an input terminal serving as said other input terminal and the same structure as said first transimpedance amplifier, and a differential amplifier using each output of said first and second transimpedance amplifiers as its differential input.

4. An optical network system comprising a master station having an optical receiver according to claim 1, a slave station having an optical transmitter, and an optical fiber for connecting the optical receiver of said master station with the optical transmitter of said slave station.

5. The optical network system according to claim 4, wherein the optical receiver of said master station and the optical transmitter of said slave station are respectively controlled by a time-division multiple-access control circuit.

6. An optical receiver comprising a differential input amplifier, a first photoelectric converter element whose cathode is connected to a reverse-bias power supply and whose anode is connected to one input terminal of said differential input amplifier, and a second photoelectric converter element whose anode is connected to a reverse-bias power supply and whose cathode is connected to the other input terminal of said differential input amplifier;

wherein said differential input amplifier includes a differential amplifier including first and second transistors in which a pair of complementary inputs are input to each base of the transistors, emitters of the transistors are connected in common, and a pair of complementary outputs are output from each collector of the transistors, third and fourth transistors in which the complementary output of said differential amplifier is input to each based and a pair of complementary outputs are fetched from each emitter, and a pair of said resistance elements for returning a pair of complementary outputs of said third and fourth transistors to each base of said differential amplifier; and wherein said differential input amplifier is a transimpedance amplifier returned from a negative-phase output to a positive-phase input and from a positive-phase output to a negative-phase input respectively through a circuit element including a resistance element.

7. The optical receiver according to claim 3, wherein said first and second transimpedance amplifiers are respectively constituted with a non-inverting amplifier.

8. The optical receiver according to claim 3, wherein said differential amplifier includes a differential paired transistors to which the outputs of said first and second transimpedance amplifiers are input and third and fourth transistors using a pair of complementary outputs of said differential paired transistors as base inputs and the emitter outputs of said differential paired transistors as differential outputs.

* * * * *